Patented June 22, 1943

2,322,494

UNITED STATES PATENT OFFICE 2,322,494

PROCESS FOR BREAKING PETROLEUM EMULSIONS

Arthur F. Wirtel, Kirkwood, and Charles M. Blair, Jr., Webster Groves, Mo., assignors to Petrolite Corporation, Ltd., Wilmington, Del., a corporation of Delaware No Drawing. Application April 27, 1942, Serial No. 440,752

6 Claims. (Cl. 252—340)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The chemical compounds or compositions of matter herein described and used as a demulsifier in our process consist of hydroxyacetylated products derived from hydroxylated acids and esters. Such acids and esters must contain at least one alcoholic hydroxyl group, and the acyl radical of such acids and esters must be of the detergent-forming monocarboxy acid type and have at least 3 carbon atoms and not more than 32 carbon atoms.

The expression "detergent-forming monocarboxy acids" has been frequently employed in the literature to designate certain high molal acids having at least 8 and not more than 32 carbon atoms and characterized by the fact that they combine with alkali to form soap or soap-like materials. The commonest examples are higher fatty acids derived from animal, vegetable, or marine sources. Other well-known examples include resinic acids, such as abietic acid, naturally-occurring petroleum acids, such as naphthenic acids, oxidized petroleum acids, such as those obtained by the oxidation of petroleum hydrocarbons, waxes and the like, and certain naturally-occurring waxes. Such monocarboxy detergent-forming acids may be cyclic or acyclic. They may be saturated or unsaturated. Included also are derivatives which do not eliminate the soap-forming property and which are obviously chemical equivalents of the unmodified acid. For instance, chlorinated oleic acid will serve as satisfactorily as oleic acid. Hydrogenated abietic acid is as satisfactory as the material prior to hydrogenation. Brominated naphthenic acid is as satisfactory as the naphthenic acid itself. This also applies to similar derivatives obtainable from oxidized petroleum acids, wax acids, etc.

Some of the acids contain an alcoholic hydroxyl group as part of the acyl radical. For instance, acids such as ricinoleic acid, diricinoleic acid, hydroxystearic acid, hydroxylated acids derived by the oxidation of petroleum, hydroxylated acids derived by chlorination of an acid and subsequent reaction with caustic soda, etc. Such hydroxylated acids can react with hydroxyacetic acid in the form of an acid, or in the form of an ester in which there is no hydroxy group present as part of the alcoholic residue. For instance, ricinoleic acid, ethylricinoleate, ethylene glycol diricinoleate, etc. can react with hydroxyacetic acid by virtue of the alcoholic hydroxyl group which is part of the acyl radical.

What has been said in regard to ethylene glycol diricinoleate applies with equal force and effect to monoricinolein, diricinolein, etc. Such type of compound can combine with hydroxyacetic acid by virtue of the alcoholic hydroxyl group which is part of the acyl radical, or the alcoholic hydroxyl group, which is part of the alcoholic residue. Obviously, such reactivity is also characteristic of compounds such as monostearin, distearin, mono-olein, di-olein, mononaphthenin, dinaphthenin, and similar esters, such as ethylene glycolmonooleate, diethylene glycol monostearate, etc. Briefly, then, the compounds contemplated for reaction with hydroxystearic acid include three types, i. e.:

(a) The reactive hydroxyl group is present in the acyl radical only;

(b) The reactive hydroxyl group is present as a constituent of the alcoholic residue only; and (c) The reactive hydroxyl group is present both in the acyl position and in the alcoholic residue position.

Attention is directed to the co-pending application of Melvin De Groote, Bernhard Keiser and Arthur F. Wirtel, Serial No. 440,749, filed April 27, 1942. Said aforementioned co-pending application is concerned with a process for breaking petroleum emulsions of the water-in-oil type, characterized by subjecting the emulsion to the action of a demulsifying agent comprising a drastically-oxidized hydroxyacetylated ricinoleic acid compound selected from the class consisting of castor oil, triricinolein, diricinolein, monoricinolein, superglycerinated castor oil, castor oil estolides, polyricinoleic acid and ricinoleic acid.

In other words, in said aforementioned co-pending application there is employed as an intermediate material a compound or composition of matter, which, in the present instance, serves as a demulsifying agent in the herein contemplated process for breaking petroleum emulsions. Stated in another way, the intermediate product, which is subjected to further reaction, for instance, drastic oxidation, as described in said aforementioned co-pending application, is herein employed without further reaction as a demulsifying agent.

Insofar that we prefer to employ hydroxylated derivatives derived from fatty acids or esters thereof, and particularly, unsaturated fatty acids, and most preferably, derivatives of castor oil, we will refer in substantially verbatim language to the description in said aforementioned co-pending application which is concerned with products obtained by reaction between hydroxyacetic acid and castor oil, or related compounds.

The production of hydroxyacetylated castor oil is comparatively simple and is comparable to the manufacture of acetylated castor oil, except that hydroxyacetic acid appears to be more reactive than acetic acid, for instance, any suitably selected amount of castor oil may be treated with the appropriate amount of hydroxyacetic acid under conditions to promote esterification and remove any water formed. The usual procedures for promotion of esterification are well known, and involve one or more of the following: Employment of a temperature high enough to eliminate any water formed, for instance, 120–180° C.; sometimes the presence of a strong acid, such as a benzene-sulfonic acid in small amounts acts as a catalyst; sometimes it is expedient to pass an inert dried gas through the reacting mixture; at other times esterification may be conducted in the presence of a high boiling water-insoluble solvent, such as xylene or the like, which assists in removing the water in the form of vapors; the condensate so derived, both from the water vapor and solvent vapor is separated by gravity; and the solvent returned to the reacting chamber for further use.

The selection of suitable amounts of reactants in the manufacture of hydroxyacetylated castor oil is, of course, simple. Castor oil may be analyzed for its triricinolein content by determination of its hydroxyl or acetyl value. Such determination, of course, includes any hydroxy acid compounds other than ricinoleic acid present, but this is immaterial for the present purpose. On the average, castor oil will indicate 85–92% of triricinolein. For convenience in the present instance, one may consider triricinolein as if it were a trihydric alcohol, and thus, one may obtain mono-hydroxyacetylated triricinolein, di-hydroxyacetylated triricinolein, and tri-hydroxyacetylated triricinolein. For practical purposes, of course, there is no economical justification for trying to obtain a technically pure triricinolein and subjecting such material to hydroxyacetylation instead of employing castor oil.

Thus, the product particularly contemplated as a reactant in the present instance, is the compound or compounds obtained by the hydroxyacetylation of castor oil. For purposes of convenience, reference will be made to mono-hydroxyacetylated castor oil, di-hydroxyacetylated castor oil, and tri-hydroxyacetylated castor oil. Examination of the reaction between hydroxyacetic acid and castor oil indicates that water is formed and must be removed. Actually, the water formed may not necessarily be removed instantly, and thus may undergo certain other obvious reactions. Likewise, for reasons of economy, it may be desirable to use a highly concentrated hydroxyacetic acid instead of the anhydrous material as the selected reactant. In such instances, the water would readily enter into hydrolytic reaction with the castor oil, and thus, the product or composition which is actually acetylated may even contain glycerol, in addition to triricinolein. It is not intended, in the present instance, to claim the product obtained by oxidation of hydroxyacetylated glycerol, but it is to be noted that such material may be present cogenerically, for reasons indicated. Earlier reference to the compounds herein contemplated, and particularly for use as a demulsifier, include the hydroxyacetylated derivatives of ricinoleic acid compounds. These are now suitably qualified to be limited to triricinolein, diricinolein, monoricinolein, and ricinoleic acid, and most particularly, the cogeneric mixture obtained by the hydroxyacetylation of castor oil, including specific members mentioned subsequently.

Although it is believed that in view of what has been said, that no further description is necessary in regard to the manufacture of hydroxyacetylated castor oil, the following examples are included by way of illustration:

HYDROXYACETYLATED CASTOR OIL

*Example 1*

1,000 pounds of castor oil (triricinolein content 88%) is treated with 111 pounds of concentrated hydroxyacetic acid containing 30 percent of water. The reaction is conducted at 200–250 degrees centigrade for approximately 2 hours. Completeness of reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a mono-hydroxyacetylated castor oil.

HYDROXYACETYLATED CASTOR OIL

*Example 2*

The same procedure is employed as in Example 1, preceding, except that twice the amount of hydroxyacetic acid is employed so as to obtain a di-hydroxyacetylated castor oil.

HYDROXYACETYLATED CASTOR OIL

*Example 3*

The same procedure is followed as in Example 1, preceding, except that three times the amount of hydroxyacetylated castor oil is employed so as to yield a substantially tri-hydroxyacetylated castor oil.

HYDROXYACETYLATED CASTOR OIL

*Example 4*

The same procedure is followed as in Examples 1 to 3, preceding, except that anhydrous hydroxyacetic acid is employed and water is removed immediately upon formation. The product so obtained represents hydroxyacetylated castor oil, or more especially, hydroxyacetylated tri-ricinolein, in the presence of a minimum amount of hydroxyacetylated cogeners.

It has been pointed out previously that the demulsifiers employed in the present process are not limited to castor oil derivatives, but include a variety of other compounds, and obviously, the hydroxyacetylation of such compounds is entirely comparable to that of castor oil, although we prefer to use the anhydrous hydroxyacetic acid. The reason for this statement is that if a compound such as ethyleneglycol monooleate is subjected to hydroxyacetylation, under conditions which would result in hydrolysis or saponification, then one might end up in a product which is essentially a mixture of oleic acid and mono-hydroxyacetylated ethylene glycol. Even in this instance, there is no objection, provided that the second step were employed, to insure that such two compounds are combined. That is to say, if one desires, one might hydroxyacetylate a polyhydric alcohol so that there is at least one residual hydroxyl, and then esterify such a product with a selected detergent-forming acid, such as oleic acid. One obvious difficulty may arise—there may also be formed an ester by esterification with a hydroxyl-radical of the hydroxyacetic acid group, instead of the hyroxyl radical of the alcohol group. For this reason, our preference is to react one mole of mono-olein with one or two moles of anhydrous hydroxyacetic acid, or to react mononaphthenin with one mole of anhydrous hydroxyacetic acid.

It is to be noted that the present process does not contemplate compounds in which the polyhydroxyacetic acid radical appears. The expression "polyhydroxyacetic acid" is used in the same sense that polyricinoleic acid is used, i. e., to indicate an ester acid derived from hydroxyacetic acid by self-esterification, and characterized by the fact that the divalent radical $CH_2CO$ appears two, three, four, or five times.

It is understood, however, that in the present instance, polyhydroxyacetylated compounds are included. It is to be noted that this hyphenated expression contemplates those types of compounds in which the hydroxyacetic acid group appears two or more times, i. e., derived from compounds such as triricinolein, mono-olein, and the like, which may, in the present instance, be considered as polyhydric alcohols. Furthermore, it is immaterial as to the particular method or procedure employed to produce the herein contemplated demulsifiers. For instance, instead of a hydroxyacetic acid, one may employ the obvious equivalent, such as the acyl chloride, the anhydride, etc.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents. Moreover, said material or materials may be used alone, or in admixture with other suitable well-known classes of demulsifying agents.

It is well-known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the reagent or demulsifying agent employed in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

We particularly desire to point out that our preferred type of demulsifier is derived from unsaturated higher fatty acids, or higher fatty acid compounds. Such higher fatty acids include ricinoleic acid, oleic acid, linoleic acid, erucic acid, etc. One need not employ a single fatty acid, but may employ the naturally-occurring mixtures obtained by saponification or hydrolysis of naturally-occurring oils or fats, such as the mixed fatty acids derived from olive oil, teaseed oil, soyabean oil, cottonseed oil, linseed oil, fish oils, etc. Castor oil, of course, may be used without saponification or hydrolysis. The unsaturated fatty acids may be monoethylenic, or polyethylenic.

Such mixtures of unsaturated fatty acids may be converted into superglycerinated fats comparable to mono-oleic, or diolein, or may be converted into comparable esters having at least one free hydroxyl by reaction with various glycols and the like.

Previous reference has been made to the fact that compounds of the type herein contemplated for use as demulsifiers per se, may also serve as intermediates for the manufacture of new compounds or compositions of matter which may serve various purposes; including use as a demulsifier. Illustrating this thought, the present applicants have prepared quaternary ammonium compounds by using such described materials as an intermediate for reaction with chloracetic acid, the carboxyl radical of the chloracetic acid esterifying with the acyl hydroxyl radical of one or more terminal OHCH2OO groups which have been introduced into a fatty acid radical, such as the ricinoleyl radical of triricinolein. The compound thus obtained is reacted further in the usual manner with pyridine to form a pyridinium derivative.

Having thus described our invention, what we claim as new and desire to secure by Letters Patent is:

1. A process for breaking petroleum emulsions of the water-in-oil type, characterized by subjecting the emulsion to the action of a demulsifier comprising a hydroxyacetylated high molal detergent-forming monocarboxy acid compound; said compound, prior to hydroxyacetylation, being selected from the class consisting of acids containing at least one hydroxyl group as part of the high molal acyl radical, esters free from any hydroxyl group in the alcoholic residue, but containing at least one hydroxyl as part of the high molal acyl radical, and esters containing at least one hydroxyl group in the alcoholic residue; the acyl radical of said high molal acids having at least 8 and not more than 32 carbon atoms.

2. A process for breaking petroleum emulsions of the water-in-oil type, characterized by subjecting the emulsion to the action of a demulsifier comprising a hydroxyacetylated higher fatty acid compound; said compound, prior to hydroxyacetylation, being selected from the class consisting of acids containing at least one hydroxyl group as part of the high molal acyl radical; esters free from any hydroxyl group in the alcoholic residue, but containing at least one hydroxyl group as part of the high molal acyl radical, and esters containing at least one hydroxyl group in the alcoholic residue; the acyl radical of said high molal acids having at least 8 and not more than 32 carbon atoms.

3. A process for breaking petroleum emulsions of the water-in-oil type, characterized by subjecting the emulsion to the action of a demulsifier comprising a hydroxyacetylated unsaturated higher fatty acid compound; said compound, prior to hydroxyacetylation, being selected from the class consisting of acids containing at least one hydroxyl group as part of the high molal acyl radical; esters free from any hydroxyl group in the alcoholic residue, but containing at least one hydroxyl group as part of the high molal acyl radical, and esters containing at least one hydroxyl group in the alcoholic residue; the acyl radical of said high molal acids having at least 8 and not more than 32 carbon atoms.

4. A process for breaking petroleum emulsions of the water-in-oil type, characterized by subjecting the emulsion to the action of a demulsifier comprising a hydroxyacetylated unsaturated higher fatty acid compound, said compound, prior to hydroxyacetylation, being an acid containing at least one hydroxyl group as part of the high molal acyl radical; the acyl radical of said high molal acid having at least 8 and not more than 32 carbon atoms.

5. A process for breaking petroleum emulsions of the water-in-oil type, characterized by subjecting the emulsion to the action of a demulsifier comprising a hydroxyacetylated unsaturated higher fatty acid compound; said compound, prior to hydroxyacetylation, being an ester free from any hydroxyl group in the alcoholic residue, but containing at least one hydroxyl group as part of the high molal acyl radical; the acyl radical of said high molal acid having at least 8 and not more than 32 carbon atoms.

6. A process for breaking petroleum emulsions of the water-in-oil type, characterized by subjecting the emulsion to the action of a demulsifier comprising a hydroxyacetylated unsaturated higher fatty acid compound; said compound, prior to hydroxyacetylation, being an ester containing at least one hydroxyl group in the alcoholic residue; the acyl radical of said high molal acid having at least 8 and not more than 32 carbon atoms.

ARTHUR F. WIRTEL.
CHARLES M. BLAIR, Jr.